(12) United States Patent
Schartz et al.

(10) Patent No.: US 6,739,186 B1
(45) Date of Patent: May 25, 2004

(54) TIRE AND RIM ASSEMBLY CENTERING METHOD

(75) Inventors: Alphonse Schartz, Colmar-Berg (LU); Jean-Pol Hansenne, Bastogne (BE); Didier Winkin, Bastogne (BE); Joe Maleto, Merscheid (LU); Patrick Yasse, Attert (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 23 days.

(21) Appl. No.: 10/218,534

(22) Filed: Aug. 14, 2002

(51) Int. Cl.$^7$ ................................................. B60B 3/00
(52) U.S. Cl. ............................................. 73/146; 33/288
(58) Field of Search ............................... 73/11.04, 11.07, 73/11.08, 11.09, 649, 658, 660, 118.1, 146; 33/286, 288, 335, 336, 337; 340/438

(56) References Cited

U.S. PATENT DOCUMENTS

| | | | |
|---|---|---|---|
| 3,808,660 A | 5/1974 | Wik | 29/159 R |
| 4,011,659 A | 3/1977 | Hörvallius | 33/203 |
| 4,279,287 A | 7/1981 | Daudi et al. | 152/375 |
| 4,354,407 A | 10/1982 | Daudi et al. | 83/55 |
| 4,393,594 A | 7/1983 | Hoffman et al. | 33/203.16 |
| 4,414,843 A | 11/1983 | Kounkel et al. | 73/66 |
| 4,475,384 A | 10/1984 | Christie | 73/146 |
| 4,479,381 A | 10/1984 | Kounkel et al. | 73/66 |
| 4,537,440 A | 8/1985 | Brockway et al. | 296/108 |
| 4,815,186 A | 3/1989 | Daudi | 29/159.1 |
| 4,934,184 A | 6/1990 | Tsuji | 73/146 |
| 5,033,003 A | 7/1991 | Lees, Sr. | 364/463 |
| 5,054,918 A | 10/1991 | Downing et al. | 356/152 |
| 5,193,274 A | 3/1993 | Ball et al. | 29/894 |
| 5,380,071 A | 1/1995 | Kier, Jr. | 301/63.1 |
| 6,170,324 B1 | 1/2001 | Reese et al. | 73/146 |
| 6,237,402 B1 | 5/2001 | Reese | 73/146 |
| 2002/0100321 A1 * | 8/2002 | Douglas et al. | 73/461 |
| 2003/0005764 A1 * | 1/2003 | Colarelli et al. | 73/462 |
| 2003/0041666 A1 * | 3/2003 | Parker | 73/462 |

* cited by examiner

Primary Examiner—Eric S. McCall
(74) Attorney, Agent, or Firm—David L. King

(57) ABSTRACT

A method for minimizing the radial runout of a tire and rim assembly (10) having the steps of measuring the runout of the tire and rim assembly (10), locating the position of maximum radial runout of the tire (1) and the minimum runout of the rim (J). The method minimizes first harmonic vibrations caused by the normal assembly of these components.

11 Claims, 8 Drawing Sheets

TIRE AND RIM ASSEMBLY CENTERING METHOD

FIELD OF THE INVENTION

This invention relates to a method for correcting the radial runout of a tire and rim wheel assembly. More specifically, the method allows to minimize the radial runout of tires and of the tire and rim assembly without dismounting the assembly from the vehicle or dismounting the tire from the rim. The method allows further to correct ride vibration problems associated with large tires and rims specifically designed for off-road or agricultural use.

BACKGROUND OF THE INVENTION

The wheel assembly runout is due to a combination of the tire's runout, the rim's runout and the tractor's hub runout. These three runouts increase the total assembly runout if they are in phase or they may decrease the total assembly runout if their phasing is optimized. Bouncing or vertical shaking oscillations the tractor's driver experiences when running at speeds above 20 km/h on roads is directly related to the tire wheel assembly radial runout.

Large tires for tractors and the like vehicles may be mounted on large one or two piece rims. The rim is adapted to hold the tire. The rim has a 5° bead seat, a pair of axially outer flanges, and a drop center portion to facilitate mounting the tire over the flange portions.

In case of one piece rims, the prior art methods to correct the tire wheel assembly vibration characteristics involve the steps of locating the maximum radial runout of the tire-rim assembly, the minimum radial runout of the rim, deflating the tire, breaking down the beads and rotating the tire to a distinct, precise location on the rim, remounting the tire rim assembly and reinflating the tire. This method of vibration reduction is commonly referred to as match mounting. The match mounting method is inherently time consuming, requires the tire beads to be detached from the rim, and after completing this procedure no positive result can be guaranteed. Furthermore the measurements only provide information on the tire-rim assembly and not on the tire itself, which information could help in choosing another rim wherein the tire would perform correctly.

In case of two piece rims, the radially outer portion is an annular ring. This annular ring further has a radially inner flange with a plurality of clearance holes to which the second portion of the rim is attached. The second portion of the rim is a disk which has a central opening which preferably is tapered, this central opening engages the drive axle of the vehicle to which it is attached. Radially outward of the central opening is a plurality of holes which can be aligned with the openings of the rim and bolted to the rim by means of threaded fasteners. These attachment holes in both the rim and the disk portion each have a clearance or relatively larger opening to accept the threaded fasteners. The dimensional tolerances permit the mounted tire and rim assembly to have their respective axis of rotation to be shifted relative to the common axis of the vehicle axle and wheel disk assembly. This ability to shift the relative position of the mounted tire and rim assembly relative to the disk portion can be positively beneficial in reducing tire and rim assembly vibration on tractors.

WO-A-97/39325 relates to a method for minimizing the radial runout of such two piece rims. The method can be summarized by the following steps:

locating the position of maximum radial runout and measuring the amount of maximum radial runout;

loosening the threaded fasteners;

moving the disk radially toward the location of the maximum radial runout a distance one-half the measured maximum runout amount, and then tightening the threaded fasteners thereby securely attaching the disk to the tire and outer rim of the assembly.

The present invention has as object to determine in the field the individual tire runout and the rim runout. A further object is to give indications on the contribution of the tire and rim assembly to the bouncing of the assembly. A still further object is to predict the match mounting for the tire on the rim and the remaining optimized assembly radial runout after match mounting.

SUMMARY OF THE INVENTION

The invention provides a method for minimizing the radial runout of a tire and rim assembly, as defined in the claims which are summarized as follows.

A method for minimizing the radial runout of a tire and rim assembly, has the steps of:

a) measuring the amount of radial runout along the radially outer portions of the tread lugs by rotating the tire rim assembly around its axis;

b) measuring the radial runout of the axially inner portions of the rim by rotating the tire rim assembly around its axis;

c) calculating the first and second harmonics of the rim;

d) subtracting point by point the first and second harmonic of the rim from the radial runout of the assembly;

e) analyzing the data obtained under step (d) as representing the runout of the tire alone;

f) discarding the tire if the data obtained under step (e) fall outside a given range.

g) discarding the rim if the data obtained under step (b) fall outside a given range.

In step (b), two axially inner portions of the rim facing both tire beads can be measured; and the average value determined and used in the calculation based on step (b).

Under step (d), the maximum of the first harmonic can be considered as representing the maximum runout of the tire; and the tire is marked at that location.

The first harmonic of the data obtained under step (b) can be used such that the minimum of the first harmonic is considered as representing the minimum runout of the rim; and wherein the rim can be marked at that location.

The markings on the tire and on the rim can be aligned so as to match-mount the assembly.

The data obtained under step (d) can be used to represent the curve of the runout of the tire alone and to determine the maximum runout of the tire, and the sum of the first and second harmonic of the rim can be considered to represent the curve of the radial runout of the rim alone and from that curve one can determine the minimum runout of the rim. By matching the obtained maximum runout of the tire with the minimum runout of the rim one can consider the result as representing the match mounted tire and rim assembly and can thus predictively calculate point by point the curve of the radial runout of the assembly. Alternatively, by matching the calculated minimum runout of the tire with the maximum runout of the rim one can consider the result as representing the match mounted tire and rim assembly.

The method enables one to select a different rim, make the measurements under step (b) and predictively calculate point by point the radial runout of the assembly without ever making the assembly.

The advantages of the invention are that its implementation is fast and easy. The farmer obtains within a short time an answer on the cause of the bouncing, an indication of what exactly must be done to at least partly remove such as well as what ride behavior can be expected after match mounting.

Definitions

For ease of understanding this disclosure the following terms are used:

"Aspect Ratio" means the ratio of the tire's section height to its section width.

"Axial" and "axially" mean the lines or directions that are parallel to the axis of rotation of the tire.

"Bounce" or "Hop" means the vertical acceleration related to first Harmonic Radial Runout or Force Variation of each tire and rim assembly interacting with the other tire and rim assemblies of the vehicle.

"Circumferential" means lines or directions extending along the perimeter of the surface of the annular tire parallel to the equatorial plane EP and perpendicular to the axial direction.

"Design Rim" means a rim having a specified configuration and width. For the purposes of this specification, the design rim and design rim width are as specified by the industry standards in effect in the location in which the tire is made. For example, in the United States, the design rims are as specified by the Tire and Rim Association. In Europe, the rims are as specified in the European Tyre and Rim Technical Organization—Standards Manual and the term design rim means the same as the standard measurement rims. In Japan, the standard organization is The Japan Automobile Tire Manufacturer's Association.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Inner" means toward the inside of the tire and "outer" means toward its exterior.

"Lateral Edge" means the axially outermost edge of the tread as defined by a plane parallel to the equatorial plane and intersecting the outer ends of the axially outermost traction lugs at the radial height of the inner tread surface.

"Leading" refers to a portion or part of the tread that contacts the ground first, with respect to a series of such parts or portions, during rotation of the tire in the direction of travel.

"Lope" means once per revolution fore & aft acceleration/deceleration related to first harmonic radial runout or force variation of tire and rim assembly.

"Net-to-gross Ratio" means the ratio of the surface area of the normally loaded and normally inflated tire tread rubber that makes contact with a hard flat surface, divided by the area of the tread, including noncontacting portions such as grooves as measured around the entire circumference of the tire.

"Normal Inflation Pressure" means the specific design inflation pressure assigned by the appropriate standards organization for the service condition for the tire.

"Normal Load" means the load assigned by the appropriate standards organization for the service condition for the tire when inflated to the normal inflation pressure.

"Radial" and "radially" mean directions radially toward or away from the axis of rotation of the tire.

"Shake" means higher frequency lug induced vibration felt in cab or steering wheel or seen in movement of the exhaust stack (no particular acceleration).

"Shudder" means a lug induced vibration at low frequency, resulting in a vertical acceleration felt through the floor of the cab.

"Trailing" refers to a portion or part of the tread that contacts the ground last, with respect to a series of such parts or portions during rotation of the tire in the preferred direction of travel.

"Tramp" means side-to-side motion, or lateral acceleration, induced by first harmonic radial runout or force variation of each tire and rim assembly interacting with each other.

"Tread Arc Width" (TAW) means the width of an arc having its center located on the equatorial plane (EP) and which substantially coincides with the radially outermost surfaces of the various traction elements (lugs, blocks, buttons, ribs, etc.) across the lateral or axial width of the tread portions of a tire when the tire is mounted upon its designated rim and inflated to its specified inflation pressure but not subject to any load.

"Unit Tread Pressure" means the radial load borne per unit area (square centimeter or square inch) of the tread surface when that area is in the footprint of the normally inflated and normally loaded tire.

"Vibration Ratings" mean the subjective ride terminology wherein "slight" means rely noticeable; "moderate" means noticeable but not objectionable; "severe" means objectionable.

BRIEF DESCRIPTION OF THE DRAWINGS

The invention will be described by way of example and with reference to the accompanying drawings in which:

FIG. 7 shows a further exemplary chart of measured and calculated tire and rim runouts.

DETAILED DESCRIPTION OF THE INVENTION

Figure 1:
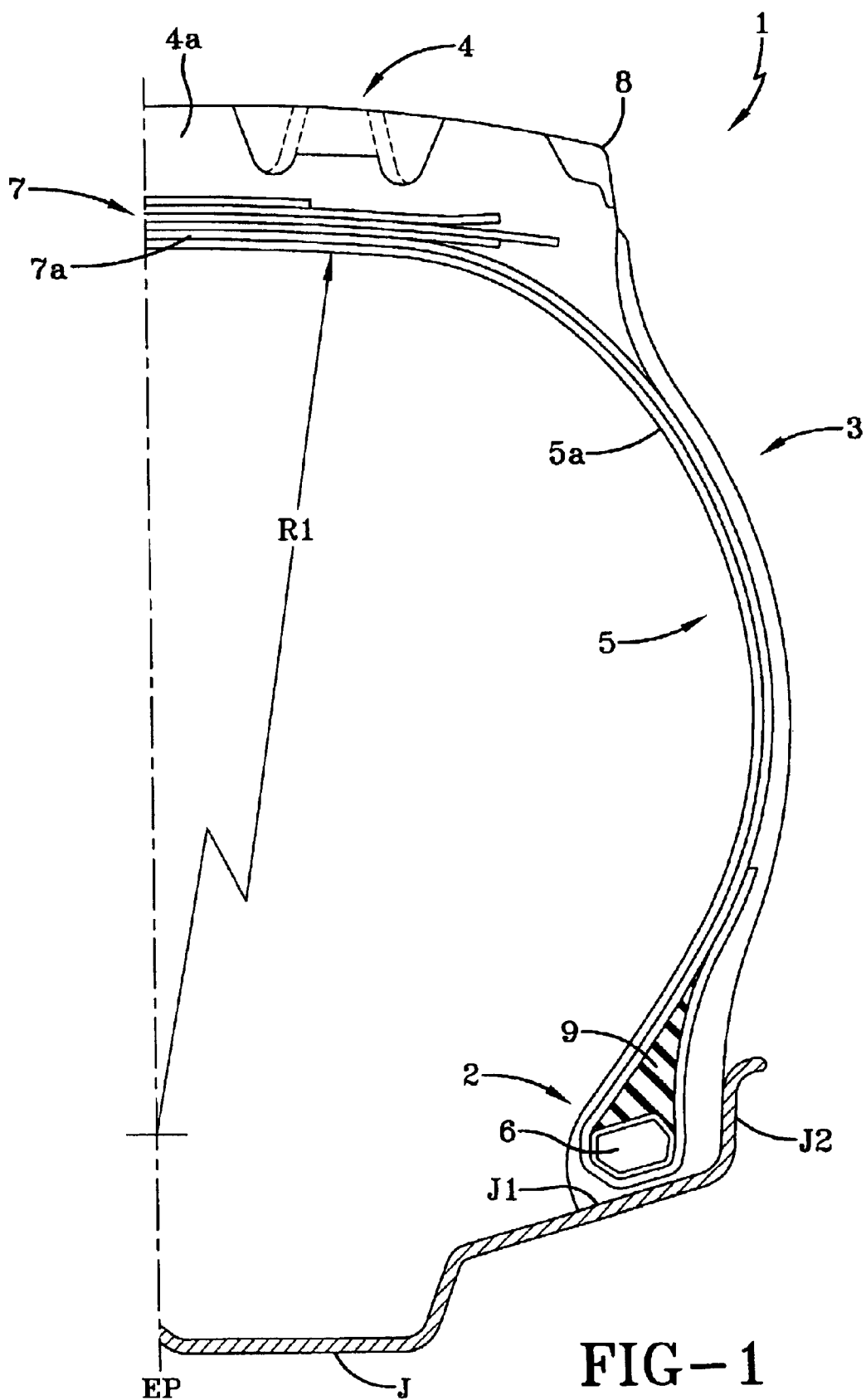
FIG. 1 shows a cross-section of a typical tire and rim assembly.

FIG. 1 shows the right half of a cross-section of a tire and rim assembly. The tire 1 has a carcass 5 having one or more carcass plies 5a, extending circumferentially about the axis of rotation of the tire. Carcass plies 5a preferably have the cords oriented substantially radially. The number of plies and the strength of the cords depend on the load carrying requirements of the tire. The carcass 5 may have three to four plies 5a reinforced by textile cords such as nylon or polyester, or one steel cord reinforced ply 5a.

The carcass plies 5a are anchored in the bead portions 2 of the tire 1. The bead portions 2 comprise annular substantially inextensible bead cores 6 surmounted by rubber apexes 9 and possibly further reinforcing plies such as chafers and chipers (not represented). The radially inner and axially outer portions of the beads 2 bear against the bead seats J1 and flanges J2 of the rim J.

A belt reinforcing structure 7 has one or more and preferably four belt plies 7a disposed radially outward from the carcass plies 5a. The belt plies 7a may be reinforced with textile cords such as polyester, nylon or aramid. Alternatively, the cords may comprise steel cords such as ultra high tensile steel cords. The belt plies 7a provide reinforcement for the crown region of the tire 1. A circumferentially extending tread 4 is located radially outwardly of the belt reinforcing structure 7.

A sidewall portion 3 extends radially inwardly from each lateral tread edge 8 of the tread 4 to an annular bead portion 2 having the beads cores 6 located therein. The tire 1 may have a directional or a nondirectional tread. Disposed between the lateral tread edges 8 there are a plurality of circumferentially spaced tread lugs 4a and possibly a circumferentially extending straight or zigzag rib.

Figure 2:
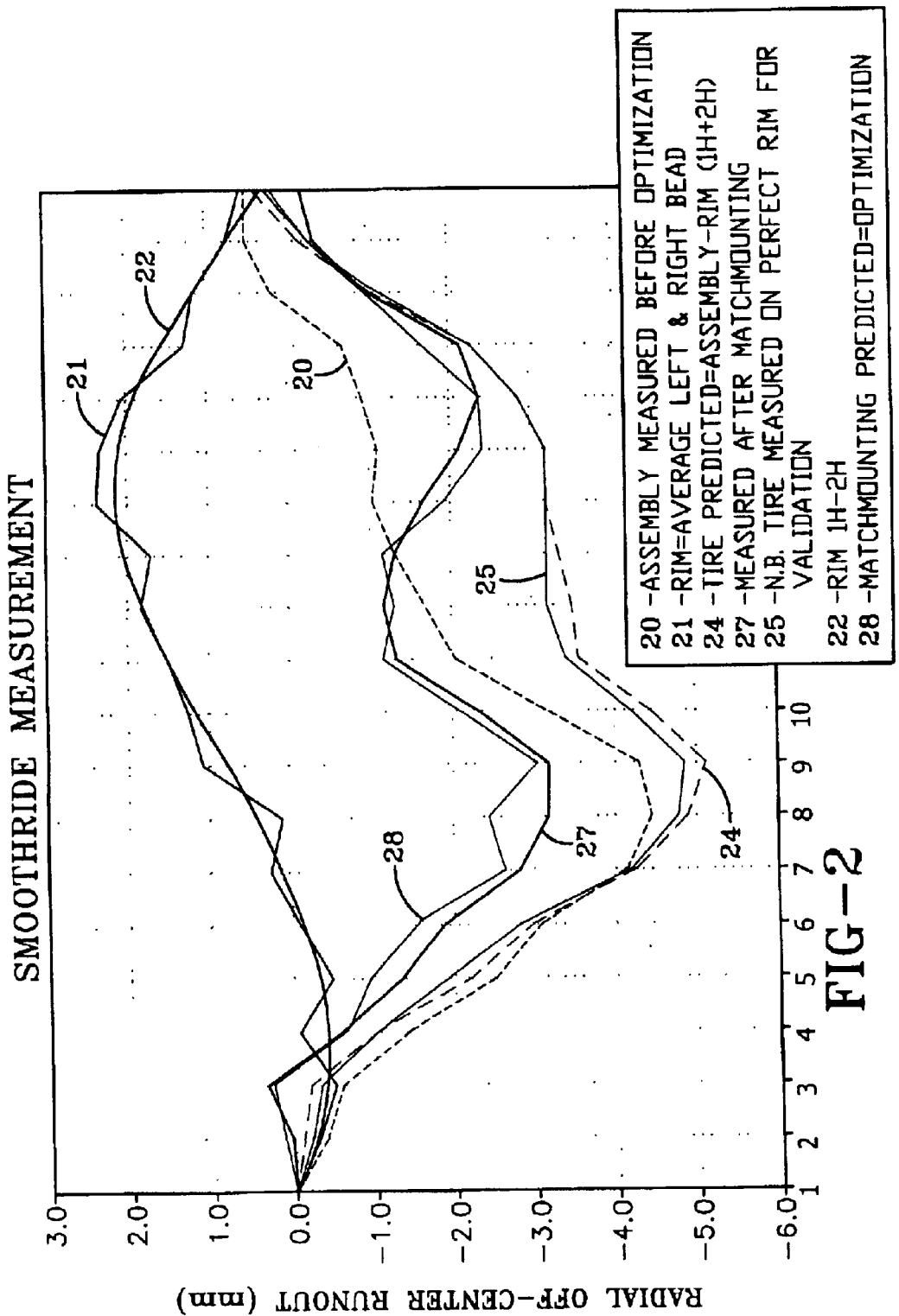
FIG. 2 shows the radial runout measurements and calculations for a tire, a rim, and a tire-rim assembly.

FIG. 2 shows the radial runout of an agricultural tire and rim assembly. The 20 circumferentially spaced lugs 4a are represented on the abscissa, whereas the runout in mm is shown on the ordinates. Line 20 shows the assembly's radial runout before optimization, the dashed line 21, the rim J radial runout as an average of the measurements made on the left and right side of the rim. Line 22 shows the runout of the rim as calculated from the first and second harmonic derived from the measurements represented by line 21. Line 24 represents the radial runout of the tire alone as calculated using the data represented by lines 20 and 22; line 25 shows the radial runout of the tire (alone) measured on a perfect rim. Line 27 shows the tire-rim runout after match-mounting as predicted and line 28 as predicted by the method according to the invention.

The first harmonic high point, low point condition of the tire and rim assembly 10 results in the tire 1 transmitting a harsh vibration to the driver of the vehicle. It is well known in the art that the most important harmonic (for speeds up to 45 km/h) is the first harmonic. This first harmonic is felt as a once-per-revolution bounce. If the bounce is bad enough, serious driver jostling in the cabin can occur. A vast majority of the ride and handling problems associated in agricultural tires results from this first harmonic radial runout condition.

Figure 6:
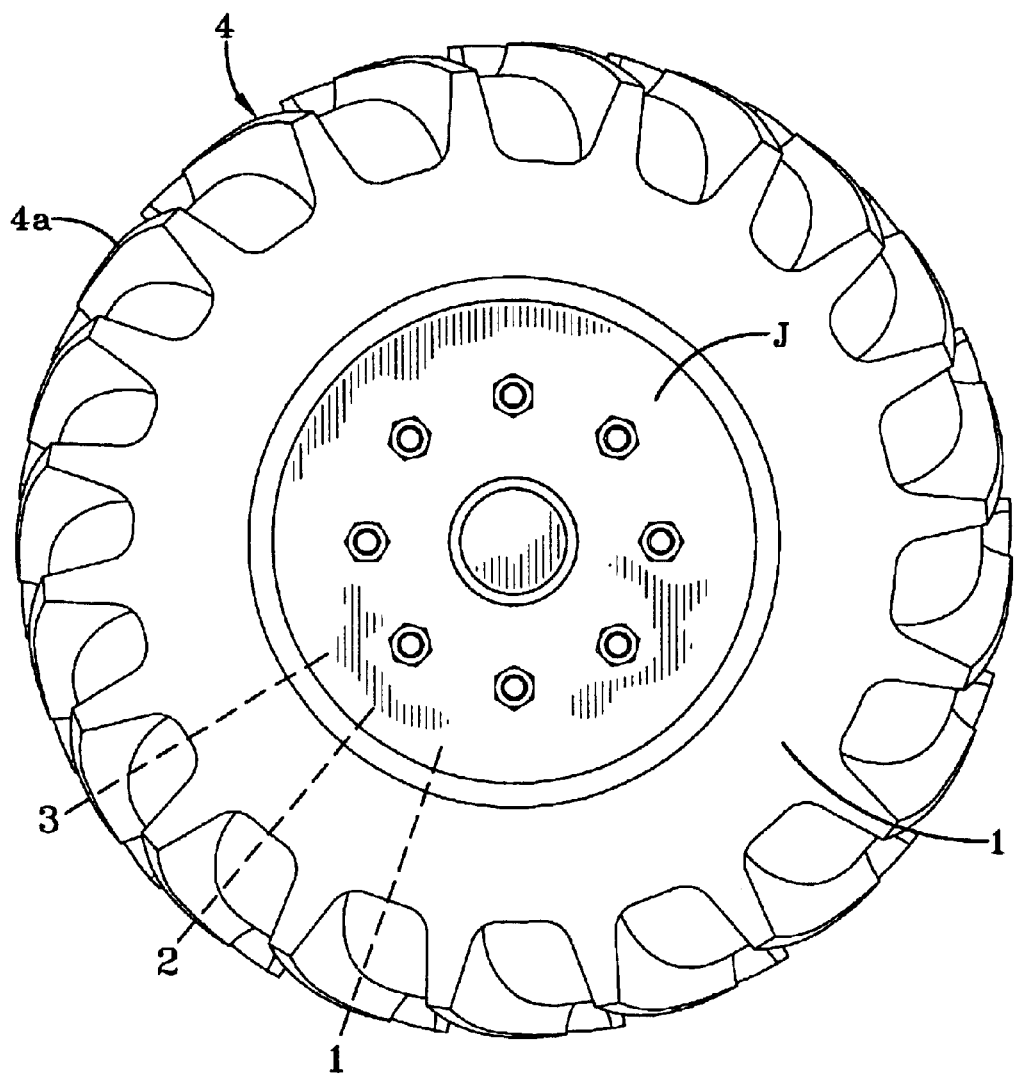
FIG. 6 is a plan view of a tire showing the first lug and rim measuring points.

Should the operator of a tractor or like agricultural vehicle find that his tire and rim assembly is creating an objectionable or severe vibration, it is possible to correct this situation using the procedure according to the invention:

First, the tire positions are recorded: Left- Front, Right-Front, Left-Rear and Right-Rear. The operator will jack the vehicle up so that both tire and rim assemblies of the same axle are able to rotate freely about their axis. As shown on FIG. 3 and FIG. 6, the first measurement points and are marked on the tire 1 and on the rim J. For statistics and comparison purposes it is advisable to choose the first measurement point always the same way, such as choosing as lug number one, the lug closest to the first letter of the brand name such as "G" for the Goodyear brand on the sidewall or the lug closest to the DOT sign, etc. as shown at location 30 in FIG. 3. Same applies to the way the tire 1 is rotated when making the measurements.

Figure 3:
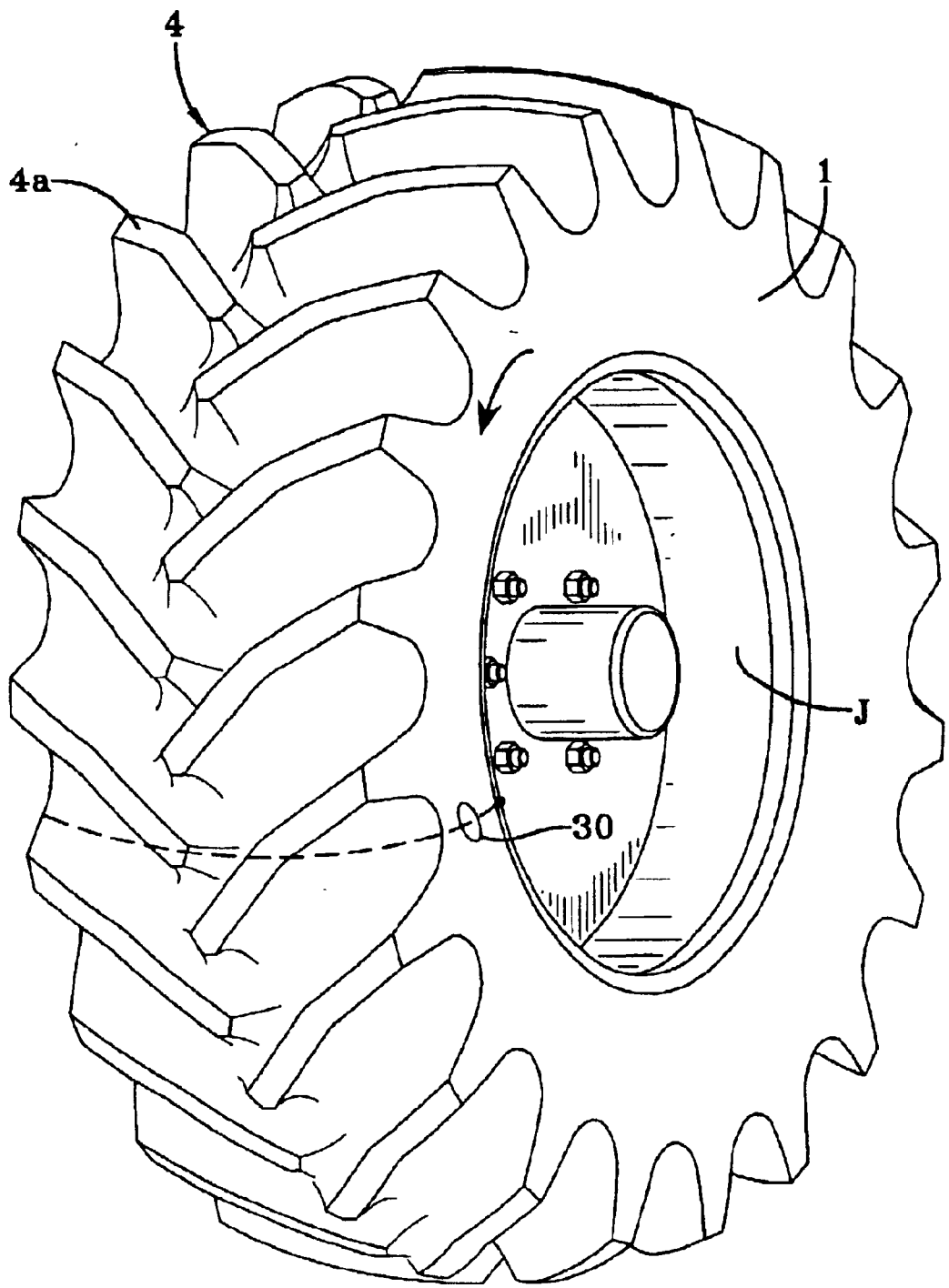
FIG. 3 is a plan view of an exemplary tire and rim assembly showing the first measurement point on the lug and rim.
Figure 4:
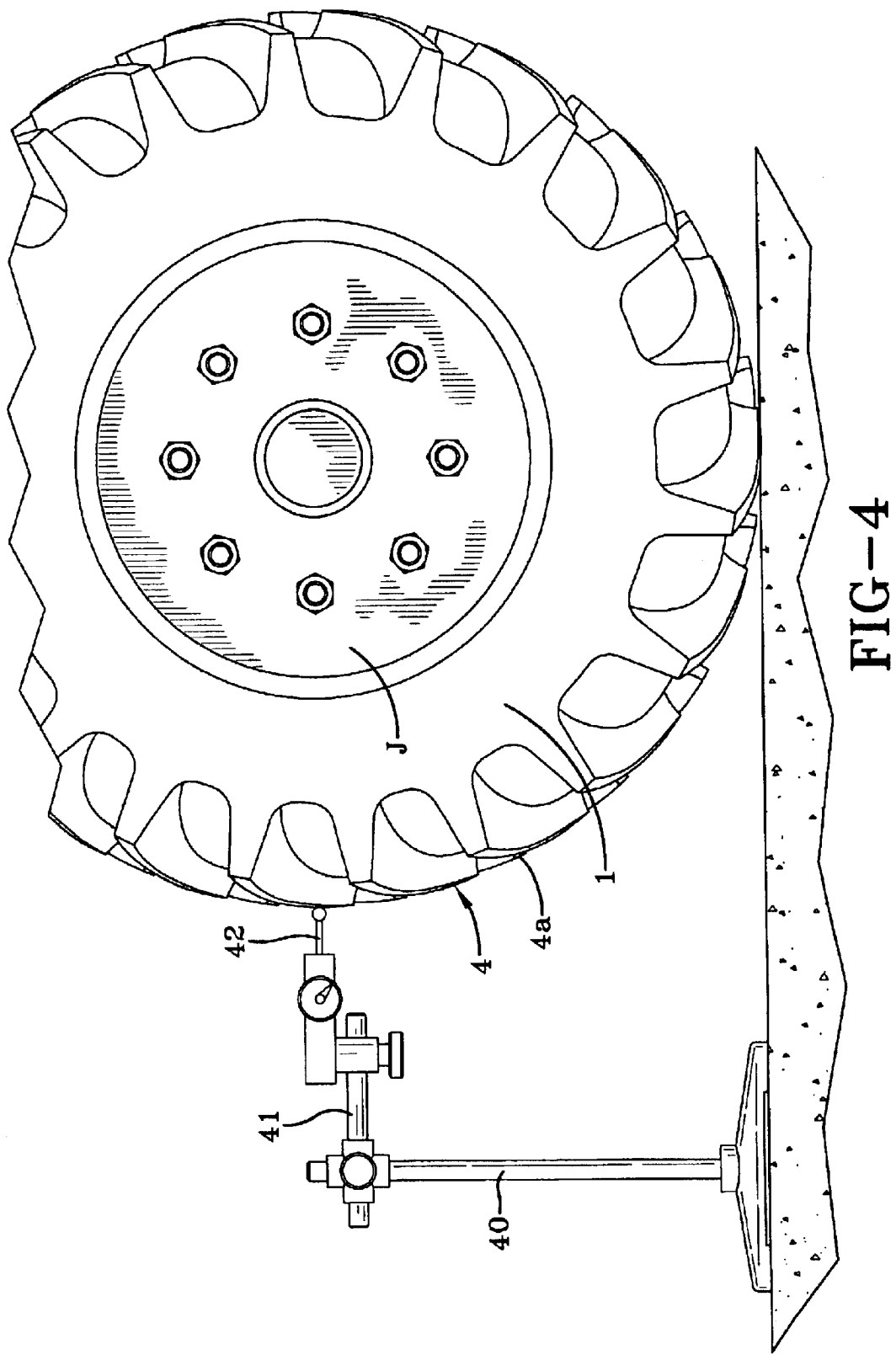
FIG. 4 is a plan view of a distance-measuring instrument aiming at the radially outer side of the tire lugs.
Figure 5:
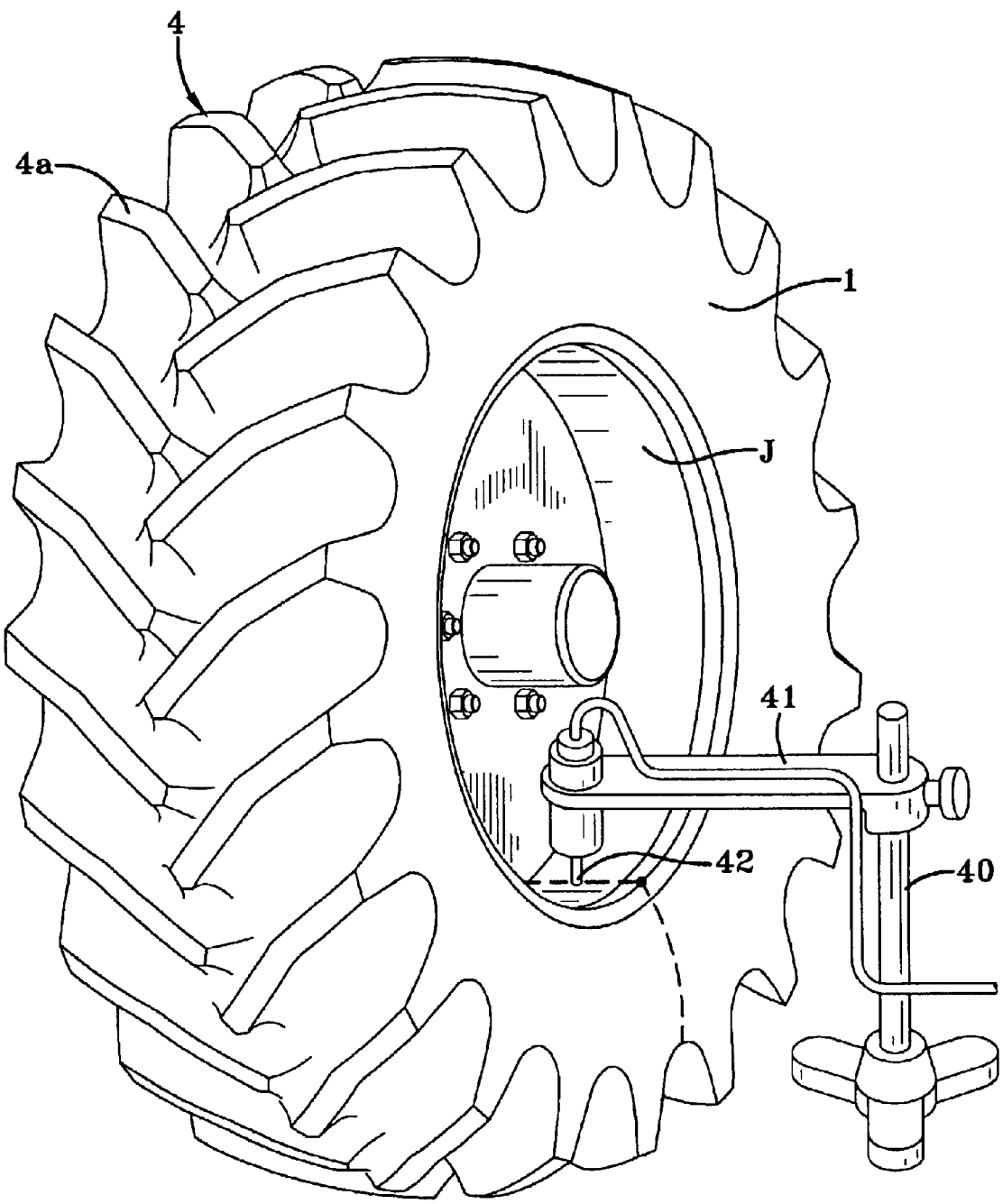
FIG. 5 is a plan view of a distance measuring instrument aiming at the radially inner side of a rim.

Then, by positioning a runout indicator device 40 in proximity to the tire 1, a measurement of the radial runout of the tire 1 is accomplished. This runout indicator device 40 as shown in FIGS. 4 and 5 has a needle 42 which is attached to an indicator arm 41 and the location of the needle tip is electronically measured. This needle is adapted to follow the contour of the tread pattern circumferentially and preferably near the equatorial plane of the tire 1. By "follow the contour of the tread pattern" is meant that the needle takes point by point measurements on the radial outer surface of the lugs 4a of the tread pattern or alternatively at equally spaced points on the radially outer surface of a rib should the tread pattern have such and should it be convenient to measure circumferentially along the rib. These point by point measurements are used in the subsequent calculations and estimations of the tire 1, the rim J and the tire-rim assembly runout behavior. In the following description it is assumed that the tread pattern has only lugs 4a. It is further assumed that the measurements are only taken at one point of every second lug. As a typical farm tire as represented in FIG. 3 has a total of about 40 lugs, the tire and rim assembly will have about 20 measurement points for the tread and the rim. An operator may obviously make one or several measurements on every lug.

Apart from mechanical sensors, electronic distance measuring devices, such as laser measuring devices can be used. It is convenient that the measured data can be fed directly into a calculating device such as a computer. Whether the distance measuring device is mechanical or electronic, the measurement tool axle should be perpendicular to the tread surface; put in other words the tool axle or its equivalent should be aiming towards the wheel rotation axle.

The measuring procedure is as follows: the lug 4a closest to the DOT week number is marked with the number 1 (see FIG. 3). The neighboring lug 4a in the forward direction of rotation of the tire 1 receives number 2, etc.

Measurement Step 1:

The tire 1 is slowly rotated. The distances from the needle tip to a point close to the circumferential center of the radially outer surface of every lug originating e.g. from the left lateral side of the tire and numbered 1, 2, 3 etc. are recorded. As indicated above, in place of one, two or more measurements can be taken on each lug 4a. The measurement points lie all in or at least close to the same plane perpendicular to the tire axis and which plane is preferably slightly spaced from the tire's equatorial plane. It is recommended that the last measurement correspond to the first measurement so as to trace and correct any shifting in the scale or change in the position of the measurement tool. This last measurement will, however, be ignored for any calculation. The measurement values so obtained are represented by line 20 in FIG. 2.

Measurement Step 2:

The measuring device 40 is located within the axially outer portion-with respect to the tractor-of the radially inner portion of the tire rim (see FIG. 5). The axis of the measuring needle should preferably be perpendicular to the surface of the rim J. The measurements should be made on the rim's flat base portions at about 20 mm from the rim edge adjacent the rim flange J2; put in other words the measurement points should be chosen so that they are close to the middle of the tire's bead seat. The rotation direction of the tire 1 during the rim J measurement must be the same as for the tire-rim assembly . The first measurement is made at the rim mark (see FIG. 3) and each subsequent measurement is made at one interlug increment as more specifically illustrated in FIG. 6 where it appears that the different measurement points on the rim J and on the tread 4 lie in the same axial planes. The number of measurements must be the same for the assembly and for the rim J and the locations as recorded must correspond.

Measurement Step 3:

It is recommended to repeat these measurement steps by positioning the measuring device 40 within the axially inner portion—with respect to the tractor—of the rim J. For some tractor brands and depending on the layout of the tractor body, the required clearance is missing preventing thereby useful measurements. In case axially inner and outer measurements are made, the subsequent calculations are based point by point on the average measured value. Though the method according to the invention allows to reduce bouncing without these—axially inner—measurements, results may be less accurate and functional. An average value of the measurement values obtained on the axially inner and outer portions of the rim J is represented by line 21 in FIG. 2.

The measurements are then made on the remaining three wheels, following the same procedure.

On a standard farm tire (and rim) usually about 17 to 23 measurement points —corresponding to the number of circumferentially spaced sets of lugs 4a—are logged. The data for the tire/rim assembly and the rim J are entered into a computer which breaks down the recorded curve into Fourier harmonics. The exemplary tire 1 has measurement points on 20 circumferentially spaced lugs 4a in each of its two sets of lugs and one measurement is taken for each lug 4a originating from the left tire side. The graph representing the assembly runout vs circumferential lug 4a represented in FIG. 2 bears 20 measurement points for the assembly and 20 measurement points for the rim J. For each of these 20 points the computer calculates point by point the values of the first (1H) second (2H), third (3H) harmonic. etc.

It appeared to the inventors that the radial runout of the rim J can advantageously be simulated by adding point by point the values of the, first and second harmonic only. The calculated radial runout of the rim J alone is represented by line 22 in FIG. 2. It appears that the measured 21 and calculated 22 values are very close and measurements on many rims J have confirmed that this approximation is appropriate. By subtracting these calculated values, namely 1H+2H of the rim (cf. line 22 of FIG. 2), from the radial runout measurements of the assembly (cf. line 20 of FIG. 2) a radial runout of the tire 1 alone (cf line 24 of FIG. 2), close to the tire's behavior, is obtained. This half measured, part calculated runout graph of the tire 1 alone is used to analyze the behavior of the tire alone or of the tire mounted on a perfect rim J, having zero runout. Alternatively this graph can be used to check if a tire 1, which may be a tire used in the field or a new tire, just leaving the plant, falls within the given uniformity range. Should a new tire be outside that range it must be reclassified.

For match mounting the tire 1 on the rim J, the tire's and the rim's first harmonic $1H_{tire}$ and $1H_{rim}$ are calculated; the results are not represented on FIG. 2. It should be noted that the harmonic $1H_{tire}$ is based on measured tire-rim assembly data wherefrom the first and second harmonics of the rim J have been subtracted. Thereafter the location position of the maximum value of the first harmonic of the tire 1 (located for instance near lug 18), and the position of the minimum value of the first harmonic of the rim J (located for instance on the axial plane cutting the measurement point on the radially outer surface of the fifth lug 4a) are determined. The tire 1 and rim J are marked accordingly. Alternatively the location position of the minimum value of the first harmonic of the tire 1 (located for instance near the eighth lug 4a), and the position of the maximum value of the first harmonic of the rim J (located for instance on the axial plane cutting the measurement point on the radially outer surface of the fourteenth lug 4a) are determined. The tire may be rotated immediately on the rim J or later at convenience such as at the next service, so as to align the markings. Apart from putting marks on the tire and on the rim, which is the presently preferred approach, especially if the match mounting is to take place at some later date by a different operator, it can be foreseen to rotate the tire relatively to the rim a specific number of lugs in the forward or reverse direction of rotation so as to obtain the match mounting; alternatively it can be foreseen to rotate the tire relatively to the rim a specific angle.

It should be noted that in the prior art, the runout of the tire/rim assembly is measured by any of the equipment mentioned above. The position where runout of the assembly is maximum is determined. Then the runout of the axially inner and/or outer portion of the rim J is measured continuously. Thereafter the tire 1 is rotated on the rim J so as to align the point where the runout of the assembly is maximum with the point where the runout of the rim J is minimum. Such match mounting is a simple minimum-maximum alignment which does not take account of the runout of the tire 1 alone and which does not select one feature of the rim J and of the tire 1, namely the first harmonic, to make the match-mounting.

The method according to the invention allows further to predict the behavior of the match-mounted tire-rim assembly. To that effect the values of the first and second harmonic of the rim J are added lug by lug (generally point by point) to the (shifted) values of the (rotated so as to be match-mounted) tire calculated above. The result is represented by line 28 in FIG. 2. This prediction is very valuable because at an early stage it is determined if it does make any sense to operate match-mounting or put in other words it can be calculated if the deviations of the specific tire 1 and rim J are compatible enough to result in an improvement of the ride vibrations. For comparison purposes the match-mounted tire-rim assembly has been measured again and the result is represented by line 27 in FIG. 2.

Statistical studies on runout measurements on match-mounted tires showed that the calculation had an average error factor of 0.6 mm with a standard deviation of 0.6 mm.

After the correction, the first harmonic runout is usually greatly minimized. It should be noted that not all tire and rim assemblies have perfect first harmonic radial runout conditions and that there may be secondary runout conditions. Nonetheless, the adjustment discussed above will minimize the first harmonic input, thus greatly reducing the amount of vibration that the operator of the vehicle was experiencing.

Figure 7A:
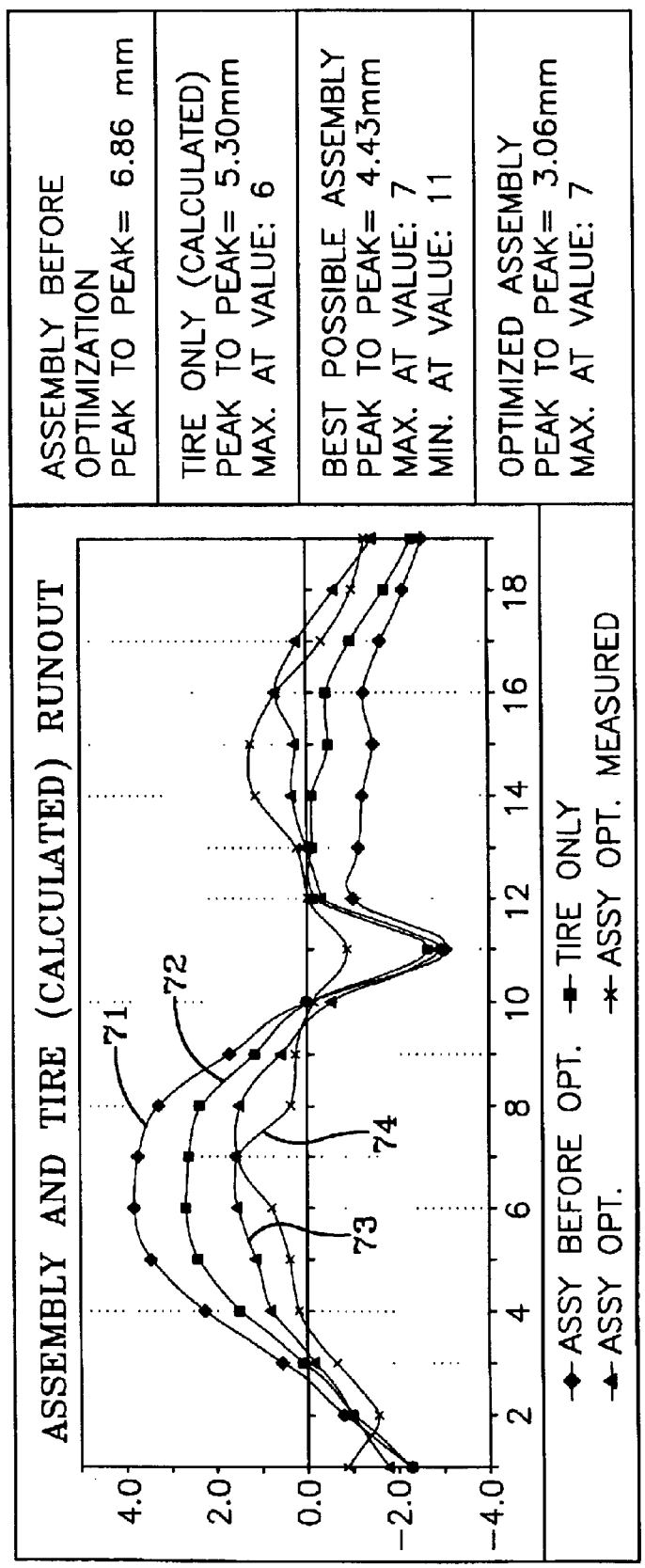
FIG. 7A shows a further example of a tire and rim, assembly runout.

FIG. 7 shows a further example of runout measurements and calculations of a tire 1 and a rim J and more specifically:

In FIG. 7A the 19 circumferentially spaced lugs 4a are represented on the abscissa, whereas the runout in mm is shown on the ordinates. The line 71 shows the assembly's radial runout before optimization; the line 72 represents the radial runout of the tire alone as calculated by subtracting the calculated values (1H+2H) of the rim, from the radial runout measurements of the assembly. Line 73 shows the optimized assembly as predicted by the method according to the invention, or put in other words, with the instant tire and rim the best result which can be obtained is as represented by 73. Line 74 shows the tire-rim assembly runout as measured after match-mounting.

Figure 7B:
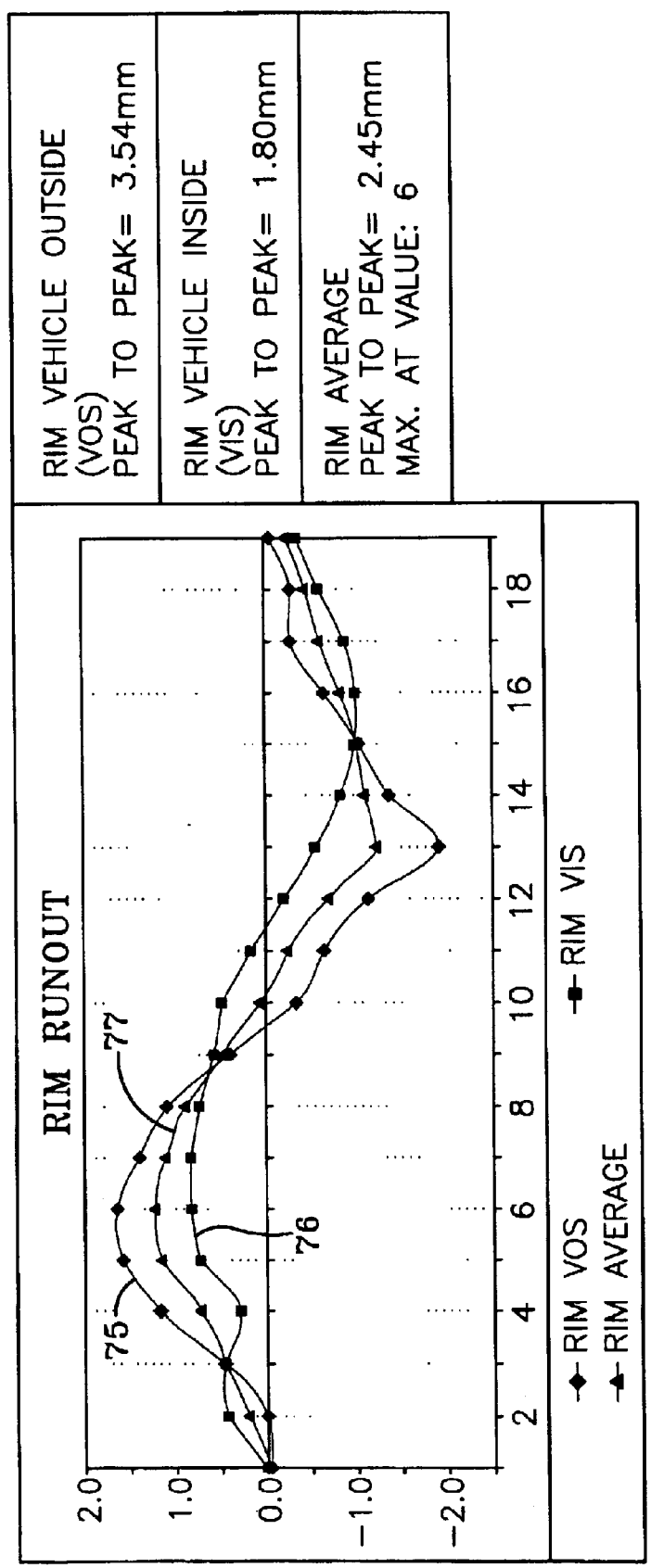
FIG. 7B shows measurements of the runout of the rim as used in the measurements and calculations in FIG. 7A.

In FIG. 7B the rim's radial runout is represented as an average (line 77) of the measurements made on the tractor's axially inner side (line 75) and axially outer side (line 76). The abscissa represent the 19 circumferentially spaced lugs of the tire and the ordinates represent the runout in mm.

It is believed that as vehicle speeds increase on agricultural type vehicles it will become more and more important for ride comfort to decrease runout.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full-intended scope of the invention as defined by the following appended claims.

What is claimed is:

1. A method for minimizing a radial runout of a tire and rim assembly, the method comprising the steps of:
   a) measuring the amount of radial runout along a radially outer portions of tread lugs by rotating the tire and rim assembly around an axis;
   b) measuring the radial runout of axially inner portions of the rim by rotating the tire rim assembly around the axis;
   c) calculating a first and a second harmonics of the rim;
   d) subtracting point by point the first and second harmonic of the rim calculated under step
   c) from the radial runout of the assembly as measured under step (a);
   e) analyzing a data obtained under step (d) as representing the runout of the tire alone;
   f) discarding the tire if the data obtained under step (e) fall outside a given range;
   g) discarding the rim if the data obtained under step (b) fall outside a given range.

2. Method according to claim 1 wherein under step (b) two radially inner portions of the rim facing both tire beads are measured; and wherein subsequently an average value is determined and used in the calculation under step (c).

3. The method of claim 1 wherein the first harmonic of the data obtained under step (d) is used and a maximum of the first harmonic considered as representing a maximum runout of the tire; and wherein the tire is marked accordingly.

4. The method of claim 3 wherein the first harmonic of the data obtained under step (b) is used and a minimum of the first harmonic considered as representing a minimum runout of the rim; and wherein the rim is marked accordingly.

5. The method of claim 4 wherein the markings on the tire and on the rim are aligned so as to match-mount the assembly.

6. The method of claim 1 wherein the first harmonic of the data obtained under step (d) is used and a minimum of the first harmonic considered as representing a minimum runout of the tire, and wherein the tire is marked accordingly.

7. The method of claim 6 wherein the first harmonic of the data obtained under step (b) is used and a maximum of the first harmonic considered as representing a maximum runout of the rim; and wherein the rim is marked accordingly.

8. The method of claim 7 wherein the markings on the tire and on the rim are aligned so as to match-mount the assembly.

9. The method of claim 1 comprising the steps of:
   considering the data obtained under step (d) as representing a curve of the runout of the tire alone, calculating the first harmonic of the tire and determining therewith a maximum or a minimum runout of the tire;
   considering a sum of the first and second harmonic of the rim as representing a curve of the radial runout of the rim alone, using the first harmonic to determine a minimum or a maximum runout of the rim;
   matching an obtained maximum respectively minimum runout of the tire with a minimum respectively maximum runout of the rim;
   considering a result as representing a match-mounted tire and rim assembly;
   calculating point by point a curve of the radial runout of the assembly.

10. The method of claim 9 further comprising the step of selecting a different rim, calculating the first and second harmonic, determining with the first harmonic a minimum or a maximum radial runout of the different rim, and calculating point by point the radial runout of a match-mounted assembly.

11. Use of the method of claim 1 in the field and on site on vehicles without dismounting the tire rim assembly from the vehicle.

* * * * *